US010479546B2

(12) United States Patent
Fasold et al.

(10) Patent No.: US 10,479,546 B2
(45) Date of Patent: Nov. 19, 2019

(54) FLUID HOUSING OF A FLUID TREATMENT SYSTEM AND FLUID TREATMENT SYSTEM

(71) Applicant: Mann+Hummel GMBH, Ludwigsburg (DE)

(72) Inventors: Michael Fasold, Auenwald (DE); Ulrich Dehnen, Kornwestheim (DE); Stefan Kunze, Tuebingen (DE); Christopher Marc Sturgess, Korntal (DE); Alexander Woell, Calw (DE); Heinz Dobusch, Freudental (DE); Alrun Spennemann, Stuttgart (DE); Oliver Voca, Heilbronn (DE); Dietmar Talmon-Gros, Oberstenfeld (DE); Andreas Kloz, Sachsenheim (DE); Lars Bachmann, Moeglingen (DE); Pamela Gohl, Remseck (DE); Oliver Glueck, Stuttgart (DE); Vasilisa Chupina, Ludwigsburg (DE); Adolf Kuttesch, Freiberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 24 days.

(21) Appl. No.: 15/651,328

(22) Filed: Jul. 17, 2017

(65) Prior Publication Data

US 2018/0022497 A1 Jan. 25, 2018

(30) Foreign Application Priority Data

Jul. 21, 2016 (DE) ........................ 10 2016 008 732

(51) Int. Cl.
*B65D 1/42* (2006.01)
*B01D 35/30* (2006.01)
(Continued)

(52) U.S. Cl.
CPC ............... *B65D 1/42* (2013.01); *B65D 43/00* (2013.01); *F01M 11/03* (2013.01); *F01P 11/12* (2013.01);
(Continued)

(58) Field of Classification Search
CPC .......... B65D 1/42; B65D 43/00; F02M 37/22; F02M 35/02441; F01M 11/03; F01P 11/12; B01D 35/00; B01D 35/30
(Continued)

(56) References Cited

U.S. PATENT DOCUMENTS 6,173,859 B1 1/2001 Schumann et al.
7,906,022 B2 3/2011 Matsushita et al.
(Continued)

FOREIGN PATENT DOCUMENTS

DE 19536613 C1 11/1996
DE 29723431 U1 10/1998

*Primary Examiner* — Madeline Gonzalez
(74) *Attorney, Agent, or Firm* — James Hasselbeck

(57) ABSTRACT

A fluid housing of a fluid treatment system of a fluid system has a housing part of plastic material that is provided with a receiving chamber for accommodating a fluid treatment component; an installation opening, closable by a closure housing part, for installing the fluid treatment component in the receiving chamber; and a housing connecting section to connect the housing part to the closure housing part. A housing fastening section is provided with which the fluid housing can be fastened to a holding component of the fluid system. An insert is at least partially introduced into the plastic material of the housing part. The insert is provided with a reinforcement region extending with sections thereof in the housing connecting section and is further provided with fastening region extending with sections thereof in the housing fastening section. A fluid treatment system with such a fluid housing is provided.

19 Claims, 4 Drawing Sheets

(51) Int. Cl.

| | |
|---|---|
| ***B65D 43/00*** | (2006.01) |
| *F01M 11/03* | (2006.01) |
| *F01P 11/12* | (2006.01) |
| *F02M 35/024* | (2006.01) |
| *F02M 37/22* | (2019.01) |

(52) U.S. Cl.
CPC ....... *F02M 35/02441* (2013.01); *F02M 37/22* (2013.01)

(58) Field of Classification Search
USPC ......................... 210/435, 440, 443, 451, 455
See application file for complete search history.

(56) References Cited

U.S. PATENT DOCUMENTS 8,017,009 B2 * 9/2011 Arteche ................. B01D 29/07 210/323.1
2011/0078986 A1 4/2011 Gorozidis

* cited by examiner

FLUID HOUSING OF A FLUID TREATMENT SYSTEM AND FLUID TREATMENT SYSTEM

BACKGROUND OF THE INVENTION

The invention concerns a fluid housing of a fluid treatment system of a fluid system, in particular of an internal combustion engine, in particular of a motor vehicle, comprising at least one housing part of plastic material which comprises at least one receiving chamber for at least one fluid treatment component for treatment of the fluid, at least one installation opening, closable by a closure housing part, for installation of the at least one fluid treatment component in the at least one receiving chamber, and at least one housing connecting section for connection of the at least one housing part with the at least one closure housing part, and comprising at least one insert which is introduced at least partially into the plastic material of the at least one housing part and which comprises at least one reinforcement region that extends at least with sections thereof in the at least one housing connecting section.

Moreover, the invention concerns a fluid treatment system of a fluid system, in particular of an internal combustion engine, in particular of a motor vehicle, comprising at least one fluid housing with at least one housing part of plastic material which comprises at least one receiving chamber for at least one fluid treatment component for treatment of the fluid, at least one installation opening, closable by a closure housing part, for installation of the at least one fluid treatment component in the at least one receiving chamber, and at least one housing connecting section for connection of the at least one housing part with the at least one closure housing part, and comprising at least one insert which is introduced at least partially into the plastic material of the at least one housing part and which comprises at least one reinforcement region that extends at least with sections thereof in the at least one housing connecting section.

DE 195 36 613 C2 discloses an oil filter for internal combustion engines with a pot-shaped housing and a cover which can be screwed onto the housing. The housing is comprised of plastic material. In the area of the thread interacting with the cover, the housing comprises a reinforcement ring of a material that is different from the remaining housing material.

The invention has the object to design a fluid housing and a fluid treatment system of the aforementioned kind in which a functionality and mechanical stability of the fluid housing can be further improved.

SUMMARY OF THE INVENTION

This object is solved according to the invention in that the fluid housing comprises at least one housing fastening section for fastening the fluid housing to at least one corresponding holding component of the fluid system and the at least one insert comprises at least one fastening region which is extending at least with sections thereof in the at least one housing fastening section.

With the at least one housing fastening section, the fluid housing can be fastened to a corresponding holding component of the fluid system. The holding component can be advantageously a housing part or a frame, in particular of an internal combustion engine and/or of a motor vehicle or the like.

According to the invention, at least one insert is provided which is extending in the at least one housing connecting section as well as in the at least one housing fastening section. The at least one insert reinforces locally the fluid housing. The at least one reinforcement region contributes to reinforcement of the plastic material of the at least one housing part. The at least one reinforcement region of the at least one insert reinforces in this context the at least one housing connecting section, in particular a thread section of a screw connection with the at least one closure housing part. In this way, connecting forces which are acting by the at least one closure housing part on the housing connecting section can be introduced better. With the fastening region of the at least one insert, fastening forces acting when fastening the fluid housing on the corresponding holding component of the fluid system can be introduced better. As a whole, by means of the at least one insert, connecting forces, which are acting by the at least one closure housing part on the housing connecting section in particular upon opening or closing the closure housing part, can be transmitted by the reinforcement region and the at least one fastening region to the corresponding holding component of the fluid system. In this way, the plastic material of the at least one housing part is mechanically relieved.

The fluid housing is embodied as a so-called hybrid module in which the at least one housing part of plastic material is provided with at least one insert. Fluid treatment systems of or with plastic material are particularly advantageous in particular with regard to their weight, integration of functionality, and costs. The hybrid construction according to the invention makes it possible that mechanical loads on the fluid treatment system, in particular the fluid module, can be absorbed and transmitted by the at least one insert which is acting as a reinforcement element at least across sections thereof. The plastic material of the housing part, on the other hand, is utilized for encapsulating the fluid as well as for forming regions that are exposed to minimal mechanical loads.

Advantageously, the at least one insert can comprise a mechanical connection between the at least one reinforcement region and the at least one fastening region. In this way, correspondingly acting forces can be distributed better. The forces can be transmitted between the at least one reinforcement region and the at least one fastening region.

Advantageously, the at least one insert can mechanically connect the at least one housing fastening section with the at least one housing connecting section. In this way, the mechanical load on the plastic material of the housing part can be reduced by the insert.

Advantageously, the at least one insert can be arranged in the force flow between the at least one housing connecting section and the at least one housing fastening section. In this way, in particular operation-caused deformations of the housing part can be counteracted better. Force flow, as is known, is to be understood as the path of a force and/or of a momentum in a component from the point of attack, i.e., the point of introduction, to the site where it is taken up by a reaction force and/or reaction momentum.

Advantageously, the at least one insert can be inserted, especially embedded, at least partially in the material, in particular the plastic material, of the at least one housing part. In this way, the insert can be surrounded at least across sections thereof by the material of the housing part. In this way, a form-fit connection between the at least one insert and the at least one housing part can be realized in a simple way.

It can also be provided that a connection of the reinforcement region and of the fastening region of the insert is created only once the fluid housing is installed on the corresponding holding component of the fluid system so that, based on an at least two-part insert, the insert with the described force-conducting function is created upon assembly. The individual parts in this context can be connected, for example, by pressing, riveting, gluing, screwing, or other types of connection.

Advantageously, the plastic material of the at least one housing part can be injection molded and/or cast around the at least one insert at least across sections thereof. In this way, the plastic material can surround the insert at least at the locations that are injection molded or cast around. In this context, the plastic material can engage by form fit possibly existing openings, recesses or holes of the at least one insert and penetrate the latter. Conversely, corresponding elevations of the at least one insert can engage the plastic material. Moreover, the plastic material can separate the insert from fluid-conducting chambers of the at least one fluid housing, in particular the receiving chamber, so that the insert does not directly adjoin fluid-conducting chambers.

Advantageously, the at least one reinforcement region of the at least one insert can be of an annular shape. In this way, it can surround circumferentially the housing connecting section, in particular the installation opening, in particular relative to a connecting axis of the connection of the closure housing part with the housing part. In this way, the reinforcement region can better support particularly a thread section of the housing connecting section.

Advantageously, the at least one housing fastening section and/or the at least one fastening region of the at least one insert can at least partially form a connecting flange of the fluid housing. By means of the connecting flange, the fluid housing can be connected to or fastened to a corresponding holding component of the fluid system.

Advantageously, the at least one closure housing part can be embodied as a housing cover. The closure housing part can comprise advantageously plastic material or can consist thereof. Correspondingly, the at least one housing part can be embodied as a housing pot.

Advantageously, the fluid housing can comprise at least one interface for at least one connector, in particular a screw and/or plug-in connector or at least one socket or hose socket. By means of the at least one connector, a fluid connection between the fluid housing and a fluid conducting system of the fluid system can be realized.

Advantageously, the fluid housing may comprise at least one inlet for the fluid to be treated and at least one outlet for treated fluid. Through the inlet, fluid can be supplied to the fluid housing for treatment, in particular to the receiving chamber of the fluid treatment component. Through the outlet, the treated fluid can be discharged from the fluid housing, in particular from the receiving chamber.

Advantageously, the at least one housing part, in particular a housing pot, can comprise at least one inlet and/or at least one outlet for fluid.

Advantageously, the at least one housing part can comprise the at least one inlet as well as the at least one outlet for fluid. In this way, all supply lines and discharge lines can be realized on one component. Accordingly, assembly and connection of the fluid treatment system can be simplified. Alternatively or additionally, at least one inlet and/or outlet can be realized on the closure housing part.

Advantageously, at least one fluid treatment component can comprise or consist of at least one filter or a filter element for the fluid and/or at least one separating device for separating particles and/or other fluids, for example, water, from the fluid, for example, fuel. Advantageously, the at least one fluid treatment component can be arranged exchangeably in the fluid housing. For servicing purposes, in particular for cleaning and/or for exchange of the at least one fluid treatment component, the at least one housing part can be opened by removal of the at least one closure housing part.

Advantageously, at least one fluid treatment component is or can be arranged in the at least one receiving chamber such that it can separate at least one inlet for the fluid to be treated from at least one outlet for treated fluid. In this way, the fluid must at least flow against the at least one fluid treatment component, in particular must flow through it.

The invention can be used in particular for fluid-conducting devices with pressure-loaded components that require a local reinforcement with connection to a fastening section.

The fluid treatment system according to the invention can be embodied as a treatment module, in particular filter module, for treatment, in particular purification, of fluids, in particular oil, fuel, water, cooling fluid, urea water solution, hydraulic liquid, air, compressed air or the like. Such treatment modules can be embodied in particular as oil filter module, fuel filter module, water filter module, urea water solution filter module, air filter module, filter module for hydraulic liquid, or the like.

The invention can be employed in motor vehicles, in particular passenger cars, trucks, buses, agricultural and/or construction vehicles, construction or agricultural machines, compressors, industrial motors, or other devices, in particular with internal combustion engines.

The invention can be employed in connection with internal combustion engines of motor vehicles as well as in other types of fluid systems of motor vehicles or other machines, in particular agricultural machines or construction machines.

The invention enables, particularly also in the field of trucks, the use of fluid treatment systems, in particular fuel and oil filter modules, that are comprised at least partially, in particular predominantly, of plastic material; this has been avoided in the past due to the greater mounting forces (diameter of the cover) and the required longer service life.

In an advantageous embodiment, the at least one insert can be arranged such that it has no direct contact with a fluid-conducting region of the fluid housing. In this way, the insert, in particular in operation of the fluid treatment system, cannot be in direct contact with the fluid. Thus, the fluid, which is conducted in the fluid treatment system, cannot affect the at least one insert, in particular cannot damage, cause corrosion or otherwise disturb it, and vice versa. Moreover, it can be avoided in this way that fluid can penetrate into the boundary regions between the at least one insert and the plastic material of the at least one housing part.

In a further advantageous embodiment, the at least one insert can be connected with form fit with the housing part. In this way, the insert can take up the forces from the housing connecting section and transmit them into the housing fastening section as clearance-free as possible.

Advantageously, in the housing connecting region a connection between the at least one insert and the at least one housing part can be realized with a radial as well as an axial form fit. In this way, the closure housing part can be radially as well as axially fixed relative to the connecting axis. In this way, tensile or compressive forces acting in axial direction with regard to the connecting axis as well as transverse forces acting in radial direction can be introduced into the at least one insert.

Advantageously, for a screw connection between the at least one closure housing part and the at least one housing part, the connection can be realized in a thread region of the at least one housing part by means of a form fit which is acting radially and axially relative to the connecting axis.

This can be realized, for example, by a circumferentially extending rib in the reinforcement region of the insert which lies under a base of the thread in the area of the installation opening and which is embedded completely in the plastic material.

In a further advantageous embodiment, the at least one insert may exhibit a higher mechanical strength than the plastic material from which the at least one housing part is at least partially formed. In this way, the at least one insert can reinforce the at least one housing part in the corresponding regions.

In a further advantageous embodiment, the at least one insert can exhibit direct contact with an environment surrounding the fluid housing with maximally approximately 50% of its surface area.

In a further advantageous embodiment, the at least one insert can comprise at least one support section, in particular a support surface, for positional fixation of the at least one insert at least during the embedding process in the plastic material of the at least one housing part. The at least one support surface can be engaged by an appropriate tool, in particular an injection molding tool, with which the at least one insert is held in the appropriate position in the plastic material of the at least one housing part until the plastic material exhibits a sufficient strength due to cooling.

Advantageously, the at least one housing part can be injection molded and/or cast from plastic material. In this case, the tool can engage the at least one support section of the at least one insert and can hold it in its position during the injection and/or casting process and optionally during solidification of the plastic material.

Advantageously, at least one support section can be arranged in a region of the at least one insert which is not surrounded by plastic material of the at least one housing part. In this way, it is not required to cover or to seal the at least one support section subsequently with plastic material. Alternatively or additionally, at least one support section can be arranged in a region of the at least one insert which is surrounded by the plastic material of the at least one housing part.

In a further advantageous embodiment, at least one fastening region can comprise at least one fastening element and/or at least one fixation element. In this way, the fluid housing can be fastened and/or fixed on the corresponding holding component by means of the at least one fastening region.

Advantageously, at least one fastening region can comprise at least one part of a screw connection. A screw connection can be connected and released simply.

Advantageously, at least one fastening region can comprises or at least partially form at least one through hole and/or at least one fastening element, in particular at least one screw lug, at least one bushing and/or at least one thread. A bushing or a screw can be passed through a through hole. An appropriate screw can be passed through a screw lug or a bushing. The screw lug or the bushing can be made of a stable material, in particular metal. In this way, an axial deformation relative to its axis by mounting forces can be greatly reduced or avoided. By means of a thread, an appropriate screw can be screwed in.

In a further advantageous embodiment, at least one fastening element can be integrated into the at least one insert, in particular produced as one piece therewith or integrally formed thereon. The insert can be, for example, provided as a cast part or forged part, wherein also the fastening elements are produced in the process. In this way, a stable connection between the at least one fastening element and at least one neighboring section of the at least one insert can be realized. Moreover, the at least one insert in this way can be realized more simply, in particular as one piece, with at least one fastening element.

Alternatively or additionally, advantageously at least one fastening element can be connected, indirectly in particular to at least one fastening leg or directly to at least one reinforcement element, by means of at least one material-fusion and/or form-fit and/or force-locked connection, in particular a fitting, a plug-in connection, an adhesive connection, a weld connection, a solder connection, a clamping connection, a locking connection, a clip connection, a rotary and/or plug-in connection, in particular a screw connection, or the like or a combination of several types of connection.

Advantageously, at least one fastening element can have the form of a hollow cylinder. A corresponding fastening means, in particular a screw or a bolt, can be passed coaxially through the hollow cylinder. Advantageously, at least one fastening element can be embodied as a bushing, fixation sleeve or compression sleeve. Screws can be passed through bushings, fixation sleeves or compression sleeves and can be screwed to the corresponding holding component. The at least one fixation sleeve/compression sleeve for the screw connection can be integrated in the at least one insert.

Advantageously, at least one screw bushing can be integrated in the at least one insert. At least one screw or a bolt can be guided and fastened in the at least one screw bushing.

In a further advantageous embodiment, the insert can connect at least two fastening elements with each other. In this way, a force-transmitting connection between the at least two fastening elements can be realized with the at least one insert.

Advantageously, the insert can comprise at least two fastening legs on which at least two fastening elements are provided, respectively.

In a further advantageous embodiment, at least one insert can comprise at least one support section for at least one function component of the fluid treatment system. In this way, a support of connectors and/or interfaces can be realized by connection to the at least one insert and/or by integration of reinforcement measures beginning at the at least one insert and extending into the connections and/or interfaces.

Advantageously, at least one function component of the fluid treatment system can be a through socket, in particular an inlet socket or an outlet socket, for fluid. The corresponding through socket can be mechanically supported by the at least one support section.

Advantageously, at least one of the function components can comprise a sensor, in particular a pressure sensor, temperature sensor, flow rate sensor, and/or mass flow sensor or the like. A connection of sensors to the plastic material of the housing part and/or to the at least one insert can be realized simply with the at least one support section.

Advantageously, the at least one insert, at least in partial areas, can take over the function of an intermediate flange. With the intermediate flange, the fluid housing can be connected with a corresponding connecting flange of the corresponding holding component.

In a further advantageous embodiment, the at least one housing connecting section can comprise at least one part of a rotatable and/or insertable connection for connecting the at least one housing part with the at least one closure housing part.

Advantageously, the rotatable and/or insertable connection can comprise a screw connection, a plug-in connection, a locking connection, a bayonet connection or the like or a combination of several such types of connection.

Advantageously, the housing connecting section can comprise at least a thread and/or a part of a bayonet-type connection.

Also, the housing connecting section of the fluid housing can be reinforced by means of the reinforcement section of the insert in radial and/or axial direction relative to the connecting axis.

In a further advantageous embodiment, the at least one insert can comprise or consist of metal, in particular die cast metal, sheet metal or the like, and/or composite material, in particular fiber composite plastic material. In this way, the at least one insert can be provided with a greater mechanical stability. Moreover, with an appropriate selection of the employed materials, a higher resistance relative to thermal and/or chemical influences can be achieved in addition; however, the increased strength compared to the plastic material is primarily decisive. The at least one insert can be comprised of metal or composite material. It can also be comprised of a combination of several materials, in particular a combination of metal and composite material.

Advantageously, the at least one insert can be comprised of die cast aluminum. In this way, a high stability can be achieved with relatively lightweight aluminum.

Moreover, the at least one insert can be processed by non-cutting processes. In this way, it can be prevented that chips contaminate the insert and thus the fluid housing.

In a further advantageous embodiment, at least the housing connecting section can comprise plastic material, in particular polymer material, or can consist thereof. In a suitable way, a fiber-reinforced and/or particle-reinforced polymer material can be employed that is characterized by increased stiffness even at higher temperature. Such materials can be processed well by an injection molding process.

Advantageously, as needed, a thread area for at least one closure housing part can comprise or consist of plastic material, in particular polymer material.

The object is further solved for the fluid treatment system in that the at least one fluid housing comprises at least one housing fastening section for fastening the at least one fluid housing on at least one corresponding holding component of the fluid system and the at least one insert comprises at least one fastening region which is extending at least with sections thereof in the at least one housing fastening section.

In other respects, the features and advantages which have been discussed in connection with the fluid housing according to the invention and the fluid treatment system according to the invention and their respective advantageous embodiments apply likewise among each other and vice versa. The individual features and advantages can of course be combined with each other, wherein further advantageous effects may result which go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will expediently consider the features disclosed in combination in the drawing, the description, and the claims also individually and combine them to further meaningful combinations.

In the Figures, same or similar components are provided with same reference characters.

DETAILED DESCRIPTION

Figure 1:
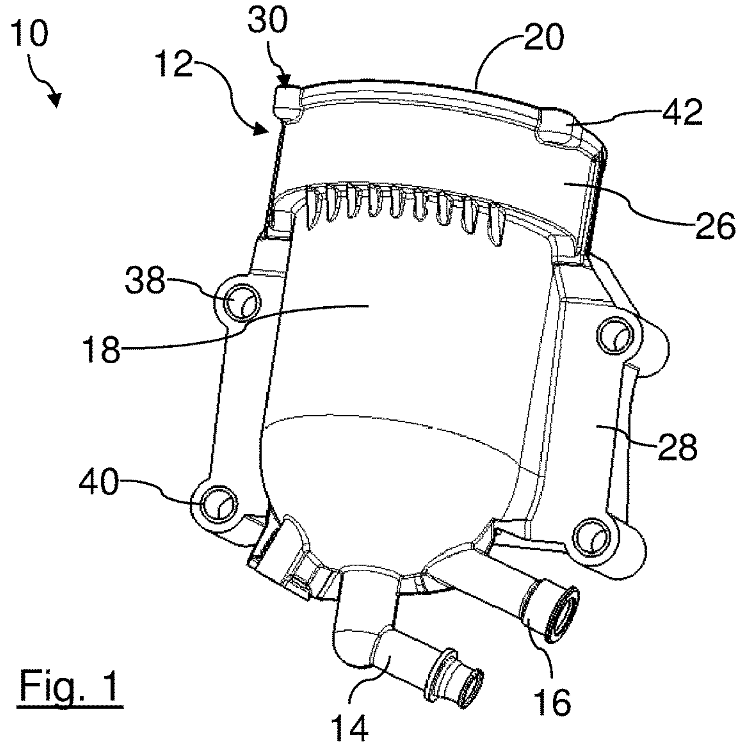
FIG. 1 shows an isometric illustration of a fluid filter module according to a first embodiment.
Figure 2:
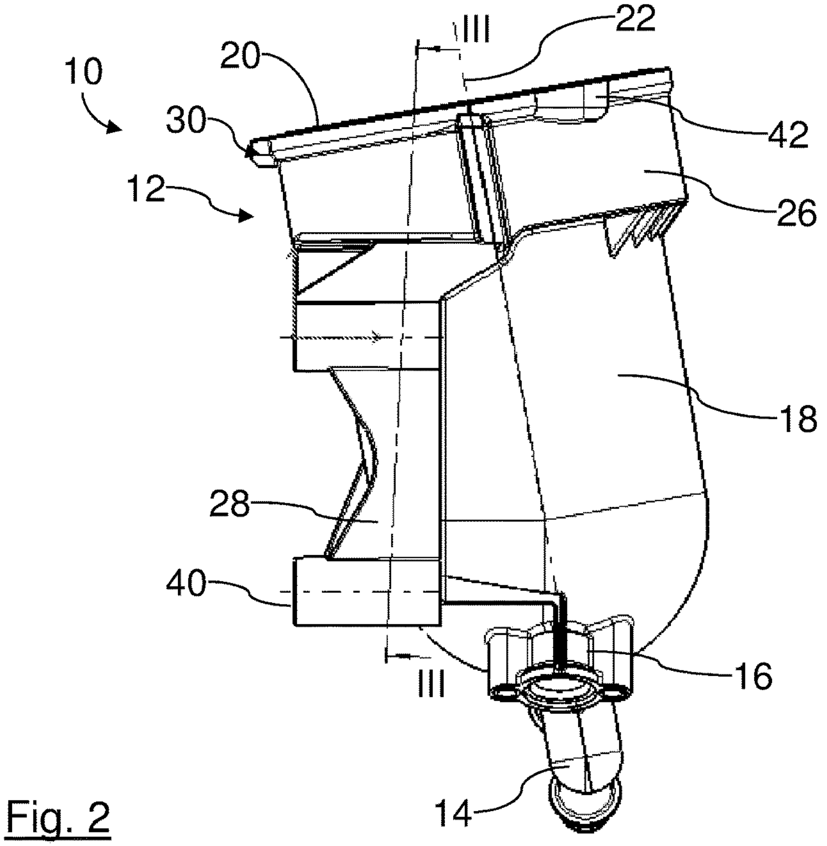
FIG. 2 is a side view of the fluid filter module of FIG. 1.
Figure 3:
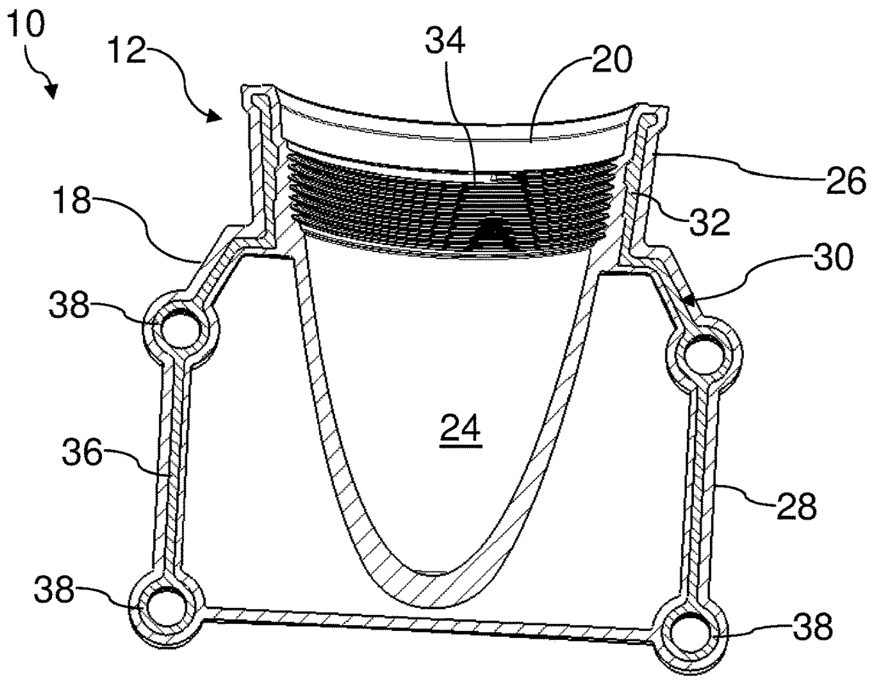
FIG. 3 shows a longitudinal section of the fluid filter module of FIGS. 1 and 2 along a section line III-III of FIG. 2.

In FIGS. 1 to 4, a fluid treatment system in the form of a fluid filter module 10 according to a first embodiment is illustrated in different illustrations. The filter module 10 can be, for example, an oil filter module, a fuel filter module or a different type of filter module for a liquid or gaseous fluid, for example, hydraulic fluid, water, urea water solution, cooling liquid, air or the like. The fluid filter module 10 can be used, for example, in connection with an internal combustion engine of a motor vehicle. The fluid filter module 10 serves in this context for purification of the corresponding fluid. It is arranged in a corresponding fluid system, for example, an oil circuit or fuel circuit.

The fluid filter module 10 comprises a fluid housing 12 with an inlet socket 14 for the fluid to be purified and an outlet socket 16 for purified fluid. In the fluid housing 12, a filter element, not illustrated in the FIGS. 1 to 4, is arranged such that it separates the inlet socket 14 fluidically from the outlet socket 16. In a way not of interest here, the corresponding fluid is filtered and the possibly contained particles are removed by means of the filter element.

The fluid housing 12 comprises a housing part in the form of a housing pot 18 and a closure housing part, not illustrated, in the form of a housing cover. The housing cover can be comprised of plastic material and is not figuratively illustrated.

For installation of the filter element, the housing pot 18 comprises an installation opening 20 that is of a circular shape in the example. The installation opening 20 can be closed off by the housing cover. Moreover, the housing pot 18 comprises an inlet socket 14 which is extending coaxially to an axis 22 into the housing pot 18 and further comprises the outlet socket 16 which is extending eccentrically to the axis 22 out of the housing pot 18. In reverse flow direction of the fluid through the filter module 10, the functions of the inlet socket 18 and of the outlet socket 16 can be switched.

The axis 22 in the embodiment coincides with a housing axis of the housing pot 18, an installation/removal axis of the filter element in the housing pot 18, and a connecting axis of the housing cover with the housing pot 18. For reasons of simplification, in the following the housing axis, the connecting axis, and the installation/removal axis are identified with the same reference character 22 and are referred to as axis 22 for short. It is understood that, depending on the context, the housing axis, the connecting axis, and/or the installation/removal axis is intended. When in the following "radial", "coaxial", "axial", "tangential", "circumferential", "concentric", "eccentric" or the like is referred to, this relates to the axis 22, if nothing to the contrary is mentioned.

Moreover, the housing pot 18 comprises a receiving chamber 24 for receiving the filter element. The inlet socket 14 and the outlet socket 16 open into the receiving chamber 24, the inlet socket 14 at the raw side, the outlet socket 16 at the clean side. The receiving chamber 24 is accessible from the exterior through the installation opening 20.

A wall area of the housing pot 18 surrounding the installation opening 20 forms a housing connecting section 26 for connecting the housing cover with the housing pot 18.

Radially outside of the housing pot 18, a housing fastening section 28 extends for fastening the fluid housing 12 to a holding component of the fluid system, for example, a frame of an internal combustion engine/motor vehicle. The housing fastening section 28 extends approximately wing-like on oppositely positioned circumferential sides of the housing pot 18.

Figure 4:
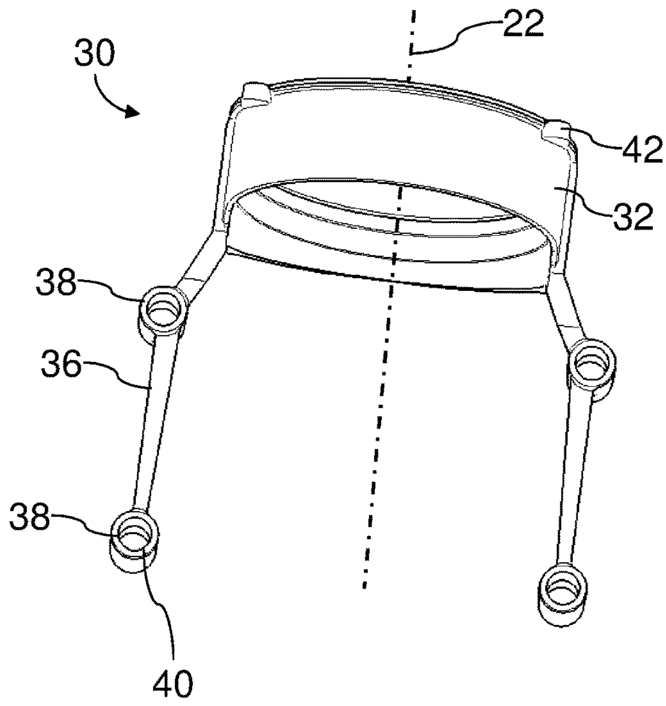
FIG. 4 is an isometric illustration of an insert of the fluid filter module of FIGS. 1 to 3 which is embedded in the plastic material of a housing pot of the fluid filter module.

The housing pot 18 is designed as a so-called hybrid component. It is comprised substantially of plastic material, for example, a polymer material, in which an insert 30, shown in detail in FIG. 4, is embedded with form fit. The insert 30 is surrounded such by the plastic material of the housing pot 18 that it has no direct contact with fluid-conducting regions of the fluid housing 12, for example, the receiving chamber 24. The insert 30 is located within a force flow between the housing connecting section 26 and the housing fastening section 28 of the housing pot 18. Accordingly, the insert 30 can take up forces acting correspondingly on the housing pot 18 and the plastic material can be relieved.

The insert 30 is realized as one piece and is comprised of metal, for example, die cast aluminum or sheet metal, or a composite material or a combination of different materials. The material of the insert 30 is mechanically more stable than the plastic material of the housing pot 18.

The insert 30 comprises an annular reinforcement region 32. The reinforcement region 32 has the shape of a round hollow cylinder. The reinforcement region 32 is arranged coaxial to the axis 22 in the housing connecting section 26. Relative to the axis 22, it is embedded by injection molding externally and internally in radial direction and on both sides in axial direction by the plastic material of the housing pot 18. In this way, the reinforcement region 32 and thus the insert 30 is held with form fit in the plastic material of the housing pot 18 in axial direction and radial direction.

The radial inner circumferential side of the housing connecting section 26 comprises an inner thread 34 within the reinforcement region 32. The inner thread 34 is the pot-associated part of a screw connection with which the housing cover can be connected to the housing pot 18 in the installation opening 20.

On the side axially facing away from the open side of the installation opening 20, the reinforcement region 32 passes into a total of two fastening regions in the form of fastening legs 36. The fastening legs 36 are located at approximately oppositely positioned sides in radial direction relative to the axis 22. Following a substantially S-shaped bend, they each extend approximately parallel to each other away from the reinforcement region 32. In the housing pot 18, the fastening legs 36 are extending on the respective side in one of the wings of the housing fastening section 28. The housing fastening section 28 and the fastening legs 36 embedded therein form a connecting flange with which the fluid filter module 10 can be fastened to the holding component of the fluid system.

Each fastening leg 36 comprises two fastening elements 38. The fastening elements 38 are integrated in the insert 30. The fastening elements 38 are each hollow cylindrical fixation sleeves. The imaginary axes of the fixation sleeves of the total of four fastening elements 38 extend parallel to each other and tangentially at a slant to an imaginary cylinder about the axis 22 (see FIG. 3). A respective end face 40 of the fastening elements 38 which is facing away from an imaginary center plane with the axis 22 is located in an imaginary plane which is perpendicular to the respective axis. The plane with said end faces 40 is extending at a slant relative to the axis 22 on one side of the aforementioned imaginary center plane. The fastening legs 36 extend also at a slant to the axis 22.

On the fastening legs 36, two fastening elements 38 are provided, respectively, one at the free ends of the legs 36 and one facing the reinforcement region 32. The sections of the fastening legs 36 between the fastening elements 38 each extend in a corresponding imaginary plane which is extending through the axes of the fastening elements 38 of the corresponding fastening legs 36. In this way, a stable force connection between the respective fastening elements 38 of the corresponding fastening leg 36 and the reinforcement region 32 can occur.

On the end faces 40 of the fastening elements 38 that are not embedded by injection molding (see FIG. 1), corresponding fastening means, for example, screws or bolts, for fastening to the holding part of the fluid system or support means of the holding part can be supported.

The fastening legs 36 and the fastening elements 38 are each embedded in the plastic material of the housing pot 18 in the housing fastening section 28. In this context, the respective end faces 40 and the respective end faces positioned axially opposite thereto relative to the axis of the fastening elements 38 are free of plastic material. Also, the radial inner circumferential sides of the fastening elements 38 are free of plastic material. The housing fastening sections 28 form continuous fastening holes in the area of the fastening elements 32.

At the free rim of the reinforcement region 32 which is facing away from the connecting legs 36 relative to the axis 22, several support noses 42 with respective support surfaces extend outwardly in radial direction. The support noses 42 project out of the plastic material of the housing connecting section 26. During the injection molding process, the insert 30 is positioned by the support noses 42 with appropriate tools in the plastic material of the housing pot 18 and fixed until the plastic material has solidified. In the injection molding tool, the support noses 42 are in contact with tool-associated pins and are to limit the axial movement of the insert during the injection process; thus, the support noses 42 are only partially not embedded by injection molding, i.e., in the contact area to the tool-associated pins. Generally, support noses 42 can be provided also for radial securing of the insert 30 in the injection molding tool.

As a whole, the insert 30 is in direct contact with the environment surrounding the fluid housing 12 only with the end faces 40, the oppositely positioned end faces, and the support noses 42. The end faces 40, the oppositely positioned end faces, and the support noses 42 form significantly less than 50% of the surface area of the insert 30 so that less than 50% of the surface area of the insert 30 is in contact with the environment.

Figure 5:
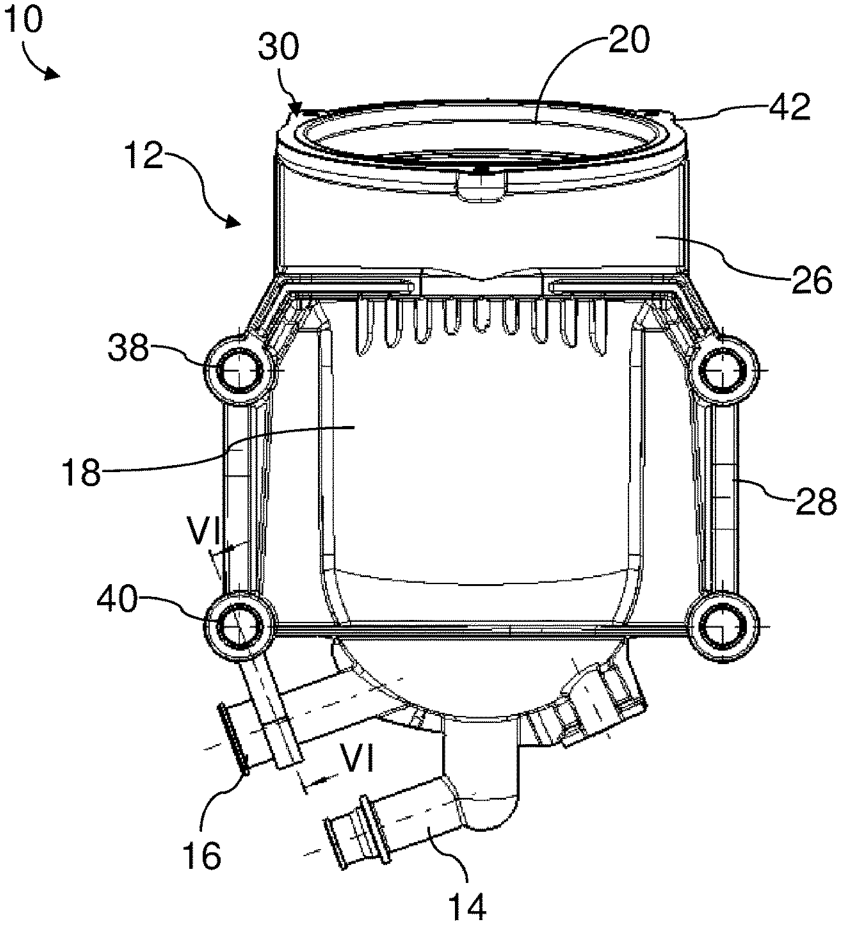
FIG. 5 is an isometric illustration of a fluid filter module according to a second embodiment.
Figure 6:
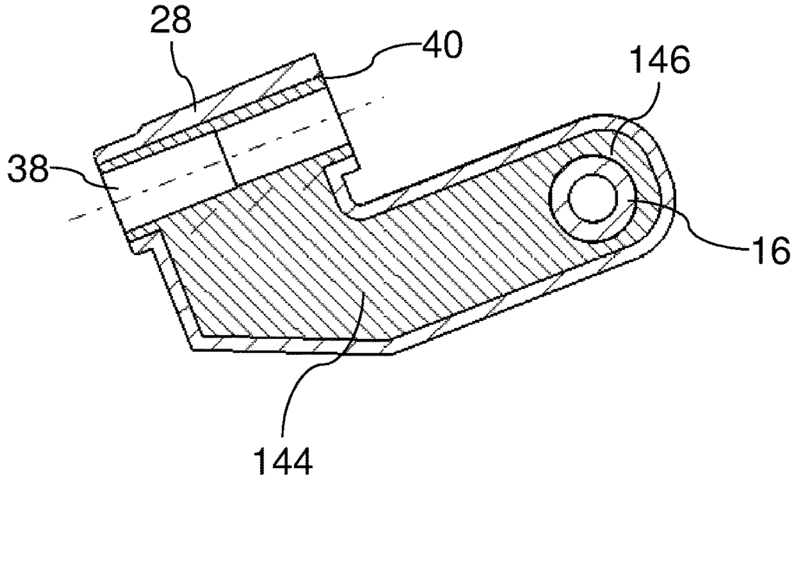
FIG. 6 is a section view of a support section for an outlet socket of the fluid filter module of FIG. 5.
Figure 7:
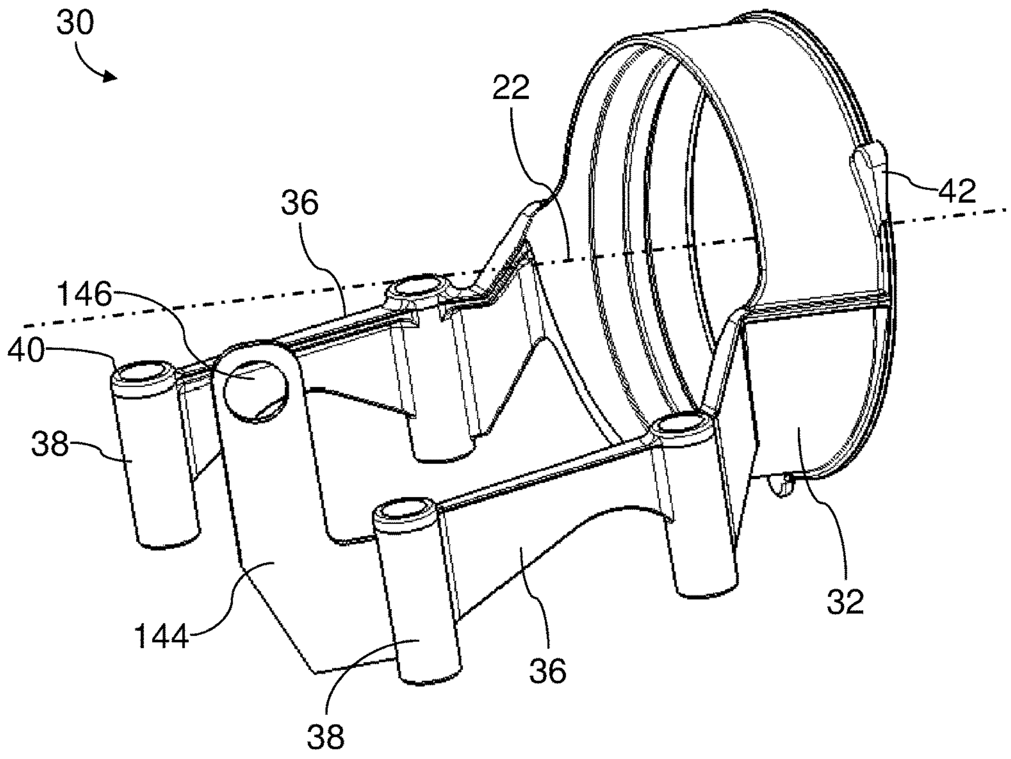
FIG. 7 is an isometric illustration of an insert with the support section of the fluid filter module of FIGS. 5 and 6 which is embedded in the plastic material of the housing part of the fluid filter module.

In the FIGS. 5 to 7, a fluid housing 12 according to a second embodiment is illustrated. Those elements that are similar to those of the first embodiment of the FIGS. 1 to 4 are identified with the same reference characters. The second embodiment differs from the first embodiment in that the insert 30 comprises additionally a support section 144. The support section 144 extends at a free end of one of the fastening legs 36. The support section 144 extends, following an appropriate bend, approximately parallel to the axes of the fastening elements 38 toward the outlet socket 16. The outlet socket 16 is supported by the support section 144. The support section 144 comprises an outlet socket opening 146 through which, coaxially thereto, the outlet socket 16 is extending.

The support section 144 is embedded by injection molding in plastic material. The plastic material which is surrounding the support section 144 is passing monolithically into the plastic material of the housing fastening section 28.

While specific embodiments of the invention have been shown and described in detail to illustrate the inventive principles, it will be understood that the invention may be embodied otherwise without departing from such principles.

What is claimed is:

1. A fluid treatment system of a fluid system comprising
at least one fluid housing, wherein the at least one fluid housing comprises:
at least one housing part of plastic material,
wherein the at least one housing part comprises:
at least one receiving chamber configured to accommodate at least one fluid treatment component for treating a fluid;
at least one installation opening, closable by a closure housing part, enabling installation of the at least one fluid treatment component in the at least one receiving chamber;
at least one housing fastening section forming a connecting flange protruding radially outwardly from an outer side of the at least one housing part and configured to fasten the fluid housing to a holding component of the fluid system;
at least one housing connecting section surrounding the installation opening and configured to connect the at least one housing part to the closure housing part;
at least one insert comprising metal and/or a composite material, the at least one insert at least partially embedded into the plastic material of the at least one housing connecting section of the at least one housing part, wherein the at least one insert comprises:
at least one annular reinforcement region of the at least one insert is embedded into the plastic material of the at least one housing connecting section such the plastic material is arranged on both radially outer and radially inner sides of the annular reinforcement region of the at least one insert; and
wherein the at least one insert comprises at least one fastening leg connected at a first end to the at least one annular reinforcement region of the at least one insert, the at least one fastening leg embedded, at least in sections, into plastic material of the connecting flange of the at least one housing fastening section.

2. A fluid housing of a fluid treatment system of a fluid system, the fluid housing comprising:
at least one housing part of plastic material, wherein the at least one housing part comprises:
at least one receiving chamber arranged in an interior of the at least one housing part and configured to accommodate at least one fluid treatment component for treating a fluid;
at least one installation opening, closable by a closure housing part, enabling installation of the at least one fluid treatment component in the at least one receiving chamber; and
wherein the at least one housing part has at least one housing connecting section surrounding the installation opening of the at least one housing part and configured to connect the at least one housing part to the closure housing part;
at least one housing fastening section forming a connecting flange protruding radially outwardly from an outer side of the at least one housing part and configured to fasten the fluid housing to a holding component of the fluid system;
at least one insert comprising metal and/or a composite material, the at least one insert at least partially embedded into the plastic material of the at least one housing connecting section of the at least one housing part, wherein the at least one insert comprises:
at least one annular reinforcement region of the at least one insert is embedded into the plastic material of the at least one housing connecting section such the plastic material is arranged on both radially outer and radially inner sides of the annular reinforcement region of the at least one insert; and
wherein the at least one insert comprises at least one fastening leg connected at a first end to the at least one annular reinforcement region of the at least one insert, the at least one fastening leg embedded, at least in sections, into plastic material of the connecting flange of the at least one housing fastening section.

3. The fluid housing according to claim 2, wherein
the plastic material is at least partially injection molded around the at least one insert.

4. The fluid housing according to claim 2, wherein
the at least one insert exhibits a higher mechanical strength than the plastic material of the at least one housing part.

5. The fluid housing according to claim 2, wherein
the at least one insert is arranged such that the at least one insert has no direct contact with a fluid-conducting region of the fluid housing.

6. The fluid housing according to claim 5, wherein
the at least one insert comprises a surface area of maximally 50% that is in direct contact with an environment surrounding an exterior of the fluid housing.

7. The fluid housing according to claim 2, wherein
the at least one insert comprises at least one support section configured to positionally fix the at least one insert at least during embedding in the plastic material by injection molding the plastic material of the at least one housing part about the at least one insert.

8. The fluid housing according to claim 7, wherein
the at least one support section is at least partially not covered by the plastic material of the at least one housing part during injection molding.

9. The fluid housing according to claim 7, wherein
the at least one support section comprises at least one support surface.

10. The fluid housing according to claim 2, wherein
the at least one fastening leg is integrated into the at least one insert, the at least one fastening leg extending outwardly away from the at least one housing part.

11. The fluid housing according to claim 10, wherein
the at least one fastening leg is formed as one piece together with the at least one insert or is integrally formed on the at least one insert.

12. The fluid housing according to claim 11, wherein
the at least one fastening leg is at least two fastening legs and wherein the at least one insert connects the at least two fastening legs with each other.

13. The fluid housing according to claim 2, wherein the at least one insert comprises at least one support section configured to support at least one function component of the fluid treatment system.

14. The fluid housing according to claim 13, wherein the at least one function component is an inlet socket or an outlet socket.

15. The fluid housing according to claim 2, wherein the housing connecting section of the fluid housing comprises a radially inner thread arranged on an radially inner surface of the fluid housing adjacent to the installation opening, the radially inner thread configured to connect fluid housing to the closure housing part.

16. The fluid housing according to claim 2, wherein the metal of the at least one insert is selected from the group consisting of die cast metal and sheet metal and wherein the composite material is fiber composite plastic material.

17. The fluid housing according to claim 2, wherein at least the housing connecting section comprises plastic material selected from the group consisting of a fiber-reinforced polymer material, a particle-reinforced polymer material; and a fiber-reinforced and particle-reinforced polymer material.

18. The fluid housing according to claim 2, wherein the at least one fastening leg has a first end connected to the annular reinforcement region of the at least one insert;

wherein the at least one fastening leg has an opposite free end arranged outwardly away from the annular reinforcement region of the at least one insert;

wherein the at least one fasting leg includes at least one hollow fixation sleeve.

19. The fluid housing according to claim 18, wherein the least two fastening legs are embedded into the plastic material of the connecting flange;

wherein the connecting flange extends between and connects the two fastening legs.

* * * * *